April 19, 1960     E. W. JOHNSON ET AL     2,933,594
METALS JOINING APPARATUS
Filed July 26, 1957
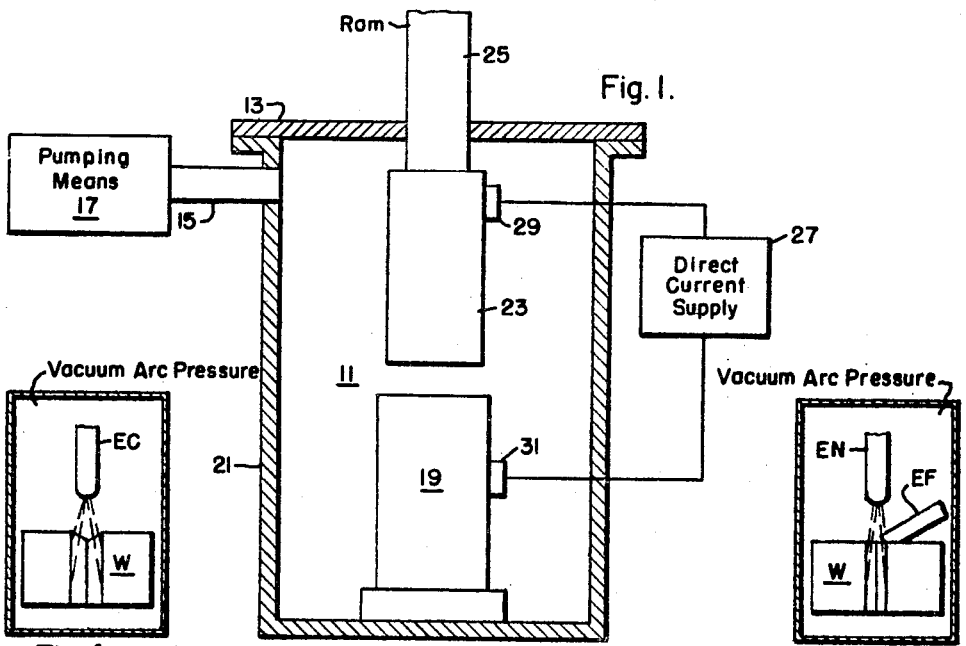
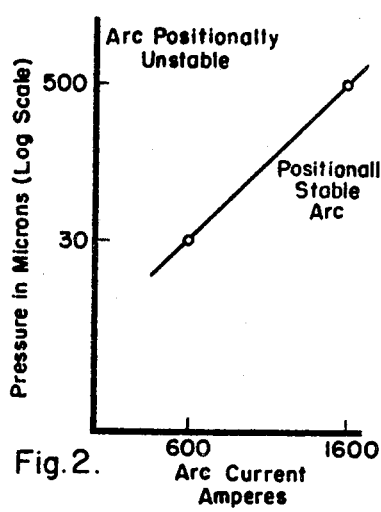
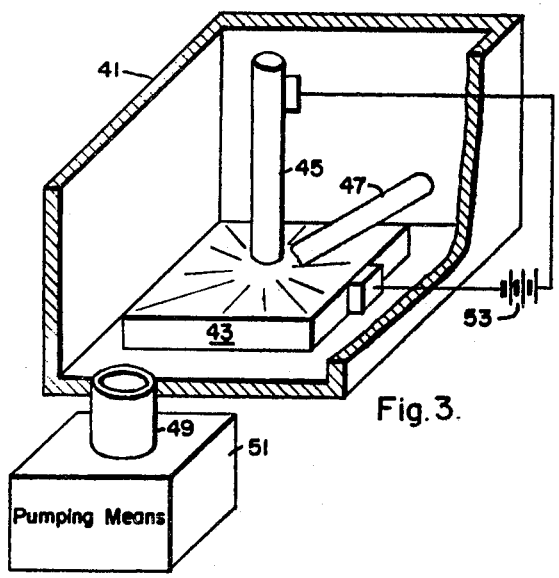
WITNESSES:
Bernard R. Gieguey
Wm. B. Sellers
INVENTORS
Edwin W. Johnson, Fujio R. Itoh
and Robert L. Readal.
BY
Hymen Diamond
ATTORNEY United States Patent Office 2,933,594
Patented Apr. 19, 1960

2,933,594

METALS JOINING APPARATUS

Edwin W. Johnson, Forest Hills, Fujio R. Itoh, Wilkinsburg, and Robert L. Readal, Hampton Township, Allegheny County, Pa., assignors to Westinghouse Electric Corporation, East Pittsburgh, Pa., a corporation of Pennsylvania Application July 26, 1957, Serial No. 674,395

12 Claims. (Cl. 219—137)

This invention relates to the joining of materials and has particular relation to the joining of refractory active materials which are electrically conducting; such refractory active materials are metals or alloys consisting of or containing substantial porportions of at least one of the elements of the class consisting of titanium, zirconium, hafnium, vanadium, molybdenum, tantalum, niobium and tungsten.

Refractory active materials have high melting temperatures and in addition are, when heated, highly reactive with atmospheric gases such as nitrogen, oxygen and hydrogen. In attempting to make joints of a part of a refractory active material with another which may be of a refractory active material or a material of any other type, it has been found that even a very minute concentration of a contaminating gas results in a joint which is not industrially acceptable. To avoid the results of the contamination elaborate precautions are taken in accordance with the teachings of the prior art. The welding of such materials as titanium or zirconium is often carried out in a sealed container in a blanket of highly pure and highly costly helium or argon gas. The brazing of metals such as titanium in accordance with the teachings of a prior art as typified by Patent 2,768,271, is also carried out in a highly pure inert gas.

The elaborate provisions which must be made in the joining of refractory active materials are necessarily costly and time consuming and it is an object of this invention to provide a method not involving the above described costly and time consuming provisions for joining parts at least one of which is of refractory active material.

A specific object of this invention is to provide a method, free of the elaborate costly and time consuming provision, for welding parts, at least one of which may be of a refractory active material.

Another specific object of this invention is to provide a method free of these provisions for brazing parts, one of which may be of a refractory active material.

A broad object of this invention is to provide a new method of joining electrically conducting materials that is particularly suitable for the joining of refractory active materials but applicable to other materials.

An ancillary object of this invention is to provide a new method of cleaning the surface of materials which is particularly applicable to the cleaning of the surfaces of materials to be welded or brazed in accordance with this invention but also has general applicability.

This invention arises from the adaption to the cleaning and joining of materials of an electrical arc discharge which has properties lending themselves peculiarly to these operations. This electrical arc discharge will be referred to here as a "vacuum arc" although it might be more precisely termed a metal vapor arc. For an understanding of what is meant by the term "vacuum arc," it is necessary to understand the marked difference between this vacuum arc and the conventional electric arc which had been studied prior to this invention.

The vacuum arc is similar to the conventional arc both with respect to its potential drop and with respect to its current carrying capacity. The potential drop both of the conventional arc and the vacuum arc is of low magnitude and is substantially constant over a wide range of arc current; the arc current both of the conventional electric arc and of the vacuum arc may be high, of the order of thousands of amperes. The vacuum arc is in general ignited in the same way as the conventional arc: by touching together electrodes between which a substantial open-circuit voltage is impressed.

The vacuum arc differs from the conventional arc with respect to the atmosphere in which it operates and in its structure and form. The conventional arc may be operated at atmospheric or higher pressure or in a partial vacuum. When the conventional arc is operated at atmospheric or higher pressures, the anode terminal of the arc remains relatively fixed while the cathode terminal wanders continuously at a high rate over a small area. With decreasing pressure the area of cathode wander increases and also the anode terminal of the arc becomes positionably unstable, tending to follow the ever wandering cathode terminal until the entire arc discharge is able to move many inches away from the position intended or desired. This positionally unstable arc has sometimes been termed a "glow discharge," although its voltage and current are characteristic of a true arc discharge. Another distinguishing feature of the conventional arc is the fact that it concentrates its heat in very small localized areas.

The concept of the vacuum arc rises from the discovery that at very low pressures an electric arc has significantly different properties than has the conventional arc. It has been found that at a given arc current an electric arc discharge is diffuse and positionally stable at the cathode when the pressure of gas or vapor in which it is operating is reduced below a particular pressure. The maximum pressure at which the positional stability and diffuseness occurs is a function of the arc current and is higher the higher the current. In observing an arc between iron electrodes, we have found that the positional stability of the arc-cathode terminal occurs at pressures below about 500 microns when the current is 1,600 amperes and below only about 30 microns when the current is 600 amperes. Unlike the heat distribution of the conventional arc the heat distribution of the vacuum arc is uniform over extensive areas both of the anode and of the cathode. This is believed to be due to the lack of magnetic constriction of the arc of these low pressures as contrasted with the strong constriction and high intensity characteristic of the conventional or higher pressure arcs. In addition, while the conventional arc is positionally stable at the anode and inherently positionally unstable at the cathode, the vacuum arc is positionally stable at the cathode and is thus anchored to the cathodic electrode. The expression "vacuum arc" as used in this application then, is a low pressure arc discharge presumably supported by metal vapor that is, positionally stable and anchored at the cathode and has its heat or its power distributed substantially uniformly both over the anode and over the cathode.

In accordance with one aspect of this invention, a method of welding with a vacuum arc is provided. In the practice of this aspect of the invention mating pieces or parts of electrically conducting material are heated by a vacuum arc so that the surfaces are fused or at least plasticized. These parts are then brought together at the low gas pressure providing a joint. This method of vacuum arc welding is particularly important in the welding of refractory active materials because the vacuum in which the arc operates serves to protect the material being welded from gaseous contamination and also facilitates the removal of any contaminating gases which may be present in the surfaces of the parts being joined. For example, in accordance with this invention the welding may be carried out at a pressure of 10 microns. This pressure is equivalent to an inert gas atmosphere of 99.999 percent purity. Thus the welding is in effect carried out at a highly pure inert atmosphere.

Welding with a consumable or non-consumable electrode with a vacuum arc may also be carried out in accordance with the broader aspects of this invention. In welding with a consumable electrode the arc is produced between the parts to be welded and the consumable electrode and the electrode is melted and deposited on the parts. In non-consumable electrode welding the vacuum arc is produced between the parts and an electrode and the parts are fused together by the heat of the arc. Because the arc is diffuse the fusing may be uniform. In the case of non-consumable electrode welding a filler material may be included.

Another aspect of this invention is a new method of brazing materials and particularly of refractory active materials. In brazing, it is essential that the parts to be joined be clean and the brazing aspect of this invention arises from the discovery that the vacuum arc is particularly highly effective in cleaning a surface to which it is produced. This is because it is able to combine the well-known effectiveness of "cathodic cleaning" with the strong impurity-removing capability of the high vacuum. In arriving at this aspect of this invention, it has been observed that the discharge at the cathode of a vacuum arc appears to consist of two components: a heated zone and a large number of very rapidly moving luminous "cathode spots." Melting of the cathode occurs at the heated zone. The "cathode spots" move rapidly and the heating provided by these rapidly moving spots is usually not sufficient to cause melting. It has been observed in arriving at this invention that the "cathode spots" invariably leave behind them bright, clean tracks on the cathodic electrode surface. The extremities of these tracks are often a considerable distance (12 inches or more) away from the heated zone of the cathode. Nearer the heated zone the cathode spot tracks merge to form a surface which is uniformly bright and very clean, in fact so free from impurities that it is highly resistant to oxidation on subsequent exposure to moist air in the case of iron. The cathode spots of the vacuum arc are thus very effective in removing completely films of oxide or other impurities from the surfaces of the parts on which the arc plays without actually damaging these surfaces.

The cathode cleaning is effective on materials of all types, both refractory active materials and others. In treating a rod of steel, that had been exposed to air, in a vacuum arc with the rod as a cathode it was observed that the length of the "cathode spot" tracks is initially very small but during the first few seconds of the vacuum arc operation the track lengths gradually increase until they become many inches long. The extremities of these tracks were observed to form an advancing front that moved away from the heated zone (that is the zone over which the diffuse discharge plays) at the end of the cathode at a readily visible rate. This behavior is interpreted as the result of a progressive scavenging of surface impurities on the cathodic electrode by small rapidly moving cathode spots.

An aspect of this invention is the vacuum arc cleaning as just disclosed in which the vacuum arc is operated at power levels insufficient to produce any melting, but effective in cleaning. While vacuum arc cleaning is peculiarly useful in brazing, it has general applicability.

In vacuum arc brazing, the surfaces of the parts to be joined are first cleaned. For this purpose a vacuum arc is produced to each of these surfaces with the surface to be cleaned as a cathode at least a substantial portion of the time of the discharge. Preferably the discharge should be of the direct current type with the surface to be cleaned as a cathode. As the cleaning of at least one of the surfaces progresses or after the cleaning is completed, the surface is tinned with a brazing material such as pure silver or a silver alloy, for example. The tinned surface is subsequently engaged either in vacuum or in air or in a special atmosphere with the surface of the other part to be brazed and the respective parts are heated so that the brazing material fuses and alloys with the surfaces being joined and a joint between them is produced. The joining may be effected at the low pressure at which the cleaning and tinning is carried out. Under certain circumstances the joining may be carried out after the parts have been removed from the low pressure region. Thus, if the refractory active part or parts to be joined are tinned with silver, the parts may be removed from the low pressure region and the joining completed in open air. The silver protects the surfaces to be joined. Where refractory active parts are to be joined and only one is to be tinned the parts should be joined at the low pressure to avoid contamination.

One of the important advantages of the brazing process just disclosed is that the vacuum serves to protect the material being heated and tinned from gaseous contamination more effectively than a highly-pure inert gas blanket. A vacuum arc discharge at ten microns of pressure is equivalent to a highly pure inert gas atmosphere and is achieved more quickly and at a lower cost than is the inert gas blanket.

Another advantage of vacuum arc brazing arises from the effectiveness of the vacuum in removing harmful impurities from the materials being heated by the discharge for cleaning and tinning. The vacuum readily permits the formation and removal of gaseous impurities from the material, gas molecules so formed diffuse rapidly away from the material surface.

Another important advantage of vacuum arc brazing results from the unusually favorable heat distribution of the vacuum arc. The heat of the vacuum arc is highly uniformly distributed over wide areas of the respective electrodes. With the vacuum arc alone it is then feasible to heat a very large area of the workpiece at one time. For this purpose the arc current or power can be set substantially higher (many times) than the maximum permissible magnitude in brazing according to the prior art with the result that the entire brazing operation can be conducted at a lower pressure in a very small fraction of the time required by the prior art methods.

The brazing and welding aspect of this invention have peculiar adaptability to the brazing of refractory active materials, but this invention in its broadest aspects is not limited to such materials. The vacuum arc method can be effectively applied to brazing, welding, and cleaning of all electrically conducting materials of sufficiently high melting temperature and thermal stability. Thus the bonding of 95 percent silver, 5 percent zirconium alloy to graphite by a vacuum arc can be most economically and quickly accomplished.

The novel features considered characteristic of this invention are disclosed generally above. The invention itself both as to its organization and its method of operation together with additional objects and advantages thereof will be understood from the following description of specific embodiments when read in connection with the accompanying drawings in which:

Figure 1 is a diagrammatic view of apparatus for welding in accordance with this invention;

Fig. 2 is a graph illustrating an important feature of this invention;

Fig. 3 is a diagrammatic view of apparatus for brazing in accordance with this invention; and Figs. 4 and 5 are diagrammatic views showing electrode welding apparatus in accordance with this invention.

The apparatus shown in Fig. 1 includes a closed container 11 provided with a removable closure 13. The container is composed of a vacuum tight material and the closure is provided with suitable seals (not shown) so that when closed the container is vacuum tight. The closure 13 has an exhaust opening 15 to which adequate pumping facilities 17 are connected.

One of the parts 19 to be welded is fixedly mounted in the base 21 of the enclosure. The other part 23 is suspended from a ram 25 which projects through an opening in the closure 13 of the container 11. The ram extends through a seal (not shown) which permits movement of the ram but seals the junction between the ram and the closure vacuum tight. The apparatus also includes a power supply 27 which may be a direct current supply, of adequate capacity which is connected to the parts 19 and 23 to be welded through the brushes or contacts 29 and 31.

In the use of the apparatus, the parts 19 and 23 to be welded are secured to the ram 25 and the support in the base 21 and the pumping facilities are actuated to reduce the pressure in the closure to a point at which an arc between the parts is a vacuum arc.

The pressure below which it is necessary that the pressure in the container 11 be reduced depends in each case on the current at which it is desired to produce the joint. This is illustrated in Fig. 2, a graph derived from work with iron electrodes in which the pressure in microns of mercury is plotted vertically on a logarithmic scale and the arc current horizontally. Similar curves can be prepared for electrodes of other materials and particularly for the refractory active materials. Vacuum arc operation takes place when the pressure and the current are such that they are defined by a point below the curve. For example, when the arc current is 1600 amperes, the pressure should be below 500 microns.

Once the pressure in the chamber is reduced to the vacuum arc range an arc is fired between the parts to be welded. For this purpose the ram may be operated to cause the movable part 23 to engage the fixed part 19 and then to retract the movable part from the fixed part. This arc is diffuse and positionally stable at the cathode. The arc current is adequate to produce surface fusion of the material. In addition, there are cathodic spots producing a cleaning action. When the ends of the parts are properly plastic the ram 25 is operated to cause these ends to become engaged and the ends are then fused forming a welded joint.

The polarity of the potential which is impressed between the parts 19 and 23 should depend on the character of the parts being welded. Where one part is refractory active and the other part is of an ordinary material, it is generally desirable that the refractory active material be the anode. In such situations, it may be desirable for the purpose of producing an initial cleaning action to operate initially with the refractory active material as the cathode at a lower current than that which would produce welding and thereafter to operate in the welding current range with the refractory active material as anode.

The welding may also be carried out with alternating current or with alternating current on which a variable direct current is superimposed, for example, as disclosed in Williams et al. 2,727,972.

The apparatus disclosed in Fig. 1, provides in effect a highly purified atmosphere within which a sound weld can be produced between parts at least one of which may be a refractory active material. Because the welding is carried out at a low pressure contaminating gases which militate against the soundness of welds in refractory active materials in other media are exhausted at a rapid rate. In addition, the heating of the materials is very uniform and thus the softening of the material and the formation of the joint is uniform over the surfaces being joined.

The apparatus shown in Fig. 3 includes a container 41 similar to that shown in Fig. 1 which may be sealed vacuum tight. Within the container a workpiece 43 is mounted. An electrode 45 is mounted adjacent the surface of the workpiece which is to be prepared for brazing. A rod or wire 47 of suitable brazing material is disposed within the container and there are provisions (not shown) for moving the rod relative to the electrode 43. Usually the rod 47 is composed of silver although other metals and alloys may be used. The container also includes an exhaust channel 49 to which adequate pumping means 51 is connected. The apparatus shown in Fig. 3 also preferably includes a power supply 53 of the direct current type; the supply may also be of the alternating current type. The supply 53 is connected between the electrode 45 and the work 43 with the work negative.

In the use of the apparatus shown in Fig. 3, the pumping means is operated to reduce the pressure within the container 41 to that at which a vacuum arc exists at the current to be conducted by the arc. A vacuum arc is then struck between the electrode 45 and the work 43. The current of this arc is below that at which the work would be melted. The vacuum arc is diffuse extending over the surface of the work 43 and includes rapidly moving cathode spots. These spots help to cause the work to be cleaned. As the work 43 is being cleaned or after it has been cleaned, the brazing material rod or wire 47 is moved into the region of the arc so that it is fused and the surface of the work is tinned. After the surface has been tinned the work may be removed from the container 41 and be engaged under pressure with the other part to which it is to be joined. Adequate heat is supplied to fuse the brazing material and a joint between the parts is made.

The apparatus shown in Fig. 3 provides facilities for carrying out brazing which is particularly suitable for the brazing of refractory active materials. If the parts to be joined are both refractory active both should be cleaned and tinned in the chamber as shown in Fig. 3 before they are removed from the chamber for joining. Where only one part is refractory active it may be necessary to tin it only with the brazing material. The joining may be carried out in the chamber within which the tinning is carried out. For this purpose, adequate facilities must be provided for heating and moving the parts together after tinning, and in particular, the reheating of the tinned parts preparatory to making the final brazed joint may be accomplished by a vacuum arc.

In Fig. 4 apparatus for welding work W with a consumable electrode EC in a vacuum arc is shown. In this case the vacuum arc discharge is produced between the electrode EC and the work W and the melted electrode is deposited on the work where the joint is to be made. After the electrode is deposited the melted electrode and the work adjacent thereto is permitted to solidify and forms a joint.

Fig. 5 shows similar apparatus for welding work W with a non-consumable electrode EN and a filler material EF by a vacuum arc discharge. The filler is melted by the discharge and deposited in the joint.

While preferred embodiments of this invention have been disclosed herein, it is realized that many modifications thereof, are feasible. This invention is then not to be restricted except insofar as is necessitated by the spirit of the prior art.

We claim as our invention:

1. The method of joining a first part of a refractory active electrically conducting material containing a substantial proportion of at least one of the class consisting of titanium, zirconium, hafnium, molybdenum, vanadium, tantalum, niobium, and tungsten, to a second part which comprises producing a direct-current electric arc discharge at least to the surface to be joined of said first part, with said first part as a cathode at a pressure below the maximum pressure at which a discharge conducting the current of said discharge is diffuse and positionally stable at the cathode to clean said surface, depositing a brazing material on said cleaned surface, engaging the surface to be joined of said second part with said surface of said first part on which said material has been deposited, and heating said parts and said material to cause said material to join said parts.

2. The method of joining a first part to a second part, both parts being of a refractory active electrically conducting material containing a substantial proportion of at least one of the class consisting of titanium, zirconium, hafnium, molybdenum, vanadium, tantalum, niobium, and tungsten which comprises producing direct-current electric arc discharges to the surfaces to be joined of each of said parts respectively, with each of said parts respectively as a cathode, to clean said surfaces to be joined, each of said discharges being produced at a pressure below the maximum pressure at which a discharge conducting the current of said discharge is diffuse and positionally stable at the cathode, depositing a brazing material on at least one of said cleaned surfaces, engaging said parts along said surfaces, and heating said material to cause said material to join said parts.

3. The method of joining a first part to a second part, both parts being of electrically conducting material which comprises producing direct current electric arc discharges to the surfaces to be joined of each of said parts respectively, with each of said parts respectively as a cathode, to clean said surfaces to be joined, each of said discharges being produced at a pressure below the maximum pressure at which a discharge conducting the current of said discharge is diffuse and positionally stable at the cathode, depositing a brazing material on at least one of said cleaned surfaces, engaging said parts along said surfaces, and heating said material to cause said material to join said parts.

4. The method of joining a first part to a second part, both parts being of electrically conducting material which comprises producing an alternating current electric arc discharge between the surfaces to be joined of said parts, to clean said surfaces to be joined, said discharge being produced at a pressure below the maximum pressure at which a discharge conducting the current of said discharge is diffuse and positionally stable at the cathode, depositing a brazing material on at least one of said cleaned surfaces, engaging said parts along said surfces, and heating said material to cause said material to join said parts.

5. The method of joining a first part to a second part, at least one part being of electrically conducting material which comprises producing an electric arc discharge to at least one of said surfaces, with said last-named surface as cathode at least a substantial part of the time during which said discharge is produced, to clean said one surface to be joined, said discharge being produced at a pressure below the maximum pressure at which a discharge conducting the current of said discharge is diffuse and positionally stable at the cathode, depositing a brazing material on said one surface, engaging said parts along said one surface and said surface to be joined of said other part, and heating said material to cause said material to join said parts.

6. The method of joining a first part to a second part, at least one part being of electrically conducting material which comprises producing an electric arc discharge to at least one of said surfaces, with said surface as cathode at least a substantial part of the time during which said discharge is produced, to clean said surface to be joined, said discharge being produced at a pressure below the maximum pressure at which a discharge conducting the current of said discharge is diffuse and positionally stable at the cathode, depositing substantially pure silver on said one surface, engaging said parts along said one surface and said surface to be joined of said other part, and heating said material to cause said material to join said parts.

7. The method of joining a first part of a refractory active electrically conducting material containing a substantial proportion of at least one of the class consisting of titanium, zirconium, hafnium, molybdenum, vanadium, tantalum, niobium and tungsten to a second part of an electrically conducting material which comprises producing an electric arc discharge between the surfaces to be joined of said parts at a pressure below the maximum pressure at which a discharge conducting the current of said discharge is diffuse and positionally stable at the cathode and when the material at said surfaces has become plastic engaging said surfaces under pressure to join said parts.

8. The method of joining a first part to a second part, each of said parts being of electrically conducting material which comprises producing an electric arc discharge between the surfaces to be joined of said parts at a pressure below the maximum pressure at which a discharge conducting the current of said discharge is diffuse and positionally stable at the cathode and when the material at said surfaces has become plastic engaging said surfaces under pressure, to join said parts.

9. The method of cleaning the surface of an electrically conducting material which comprises producing an electric arc discharge to said surface with said surface as cathode at least a substantial part of the time during which said discharge is produced, said discharge being produced at a pressure below the maximum pressure at which a discharge conducting the current of said discharge is diffuse and positionally stable at the cathode, said discharge being at a power level sufficient to produce cleaning but insufficient to produce melting of said surface and being maintained until said surface is clean.

10. The method of joining work of electrically conducting material with a consumable electrode which comprises producing an electric arc discharge between said electrode and said work at a pressure below the maximum pressure at which a discharge conducting the current of said discharge is diffuse and positionally stable at the cathode to melt said electrode, said discharge being at a power level at which said electrode is melted in the region of said arc and said work is melted in the region where it is to be joined, depositing the melted material from said electrode on said work where said work is to be joined and thereafter permitting said material and the melted work adjacent thereto to solidify into a joint.

11. The method of joining work of electrically conducting material with a non-consumable electrode which comprises producing an electric arc discharge between said electrode and said work at a pressure below the maximum pressure at which a discharge conducting the current of said discharge is diffuse and positionally stable at the cathode, said discharge being at a power level at which said work is melted in the region where it is to be joined and thereafter permitting said work in the region where it is melted to solidify into a joint.

12. The method of joining work of electrically conducting material with a non-consumable electrode and a filler material which comprises producing an electric arc discharge between said electrode and said work at a pressure below the maximum pressure at which a discharge conducting the current of said discharge is diffuse and positionally stable at the cathode, said discharge being at a power level such as to melt said filler material in said arc in the region of said work where said work is to be joined and also at a power level such as to melt said work in said region and depositing said melted filler material on said work in said region and thereafter permitting said melted filler material and the melted work adjacent thereto to solidify into a joint.

References Cited in the file of this patent

UNITED STATES PATENTS

| | | |
|---|---|---|
| 935,358 | Davis | Sept. 28, 1909 |
| 2,405,542 | Wassell | Aug. 6, 1946 |
| 2,505,054 | McElrath et al. | Apr. 25, 1950 |
| 2,613,305 | Clack | Oct. 7, 1952 |
| 2,640,792 | Binder | June 2, 1953 |
| 2,658,162 | Tichenor et al. | Nov. 3, 1953 |
| 2,681,402 | Muller | June 15, 1954 |
| 2,719,207 | Moyer | Sept. 27, 1955 |